(12) United States Patent
Jensen et al.

(10) Patent No.: US 7,134,641 B2
(45) Date of Patent: Nov. 14, 2006

(54) VALVE HAVING AXIAL AND RADIAL PASSAGES

(75) Inventors: Daniel W. Jensen, Oshkosh, WI (US); Jonathan T. Wild, Chicago, IL (US); Kenneth R. Seymour, II, Sheboygan, WI (US); James P. Burke, Bolingbrook, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 88 days.

(21) Appl. No.: 10/970,374

(22) Filed: Oct. 21, 2004

(65) Prior Publication Data
US 2006/0086922 A1  Apr. 27, 2006

(51) Int. Cl.
*F16K 51/00* (2006.01)
(52) U.S. Cl. .............. 251/149.8; 251/144; 251/346; 251/351; 141/384; 141/98; 184/1.5
(58) Field of Classification Search ............ 184/1.5, 184/88.1, 92, 105.3, 106; 251/149.8, 346, 251/347, 351, 352, 144; 141/98, 346, 384
See application file for complete search history.

(56) References Cited

U.S. PATENT DOCUMENTS

| | | | | |
|---|---|---|---|---|
| 1,652,929 A | * | 12/1927 | Cawood | 137/547 |
| 1,659,047 A | * | 2/1928 | Quinn | 184/106 |
| 2,796,148 A | * | 6/1957 | St. Clair | 184/105.1 |
| 3,387,621 A | * | 6/1968 | Schaff | 137/322 |
| 4,025,048 A | * | 5/1977 | Tibbitts | 251/144 |
| 4,078,763 A | | 3/1978 | Yamamoto | |
| 4,470,577 A | * | 9/1984 | Warwick | 251/217 |
| 4,807,847 A | * | 2/1989 | Martz | 251/144 |
| 5,096,158 A | * | 3/1992 | Burdick et al. | 251/144 |
| 5,546,979 A | * | 8/1996 | Clark et al. | 137/318 |
| 5,579,815 A | * | 12/1996 | Labonte | 141/384 |
| 6,555,000 B1 | | 4/2003 | Knight | |
| 2005/0098384 A1 | * | 5/2005 | Chang | 184/1.5 |

* cited by examiner

*Primary Examiner*—J. Casimer Jacyna
(74) *Attorney, Agent, or Firm*—Susan L. Lukasik; Dennis K. Sullivan; Elias P. Soupos

(57) ABSTRACT

A valve includes a valve body (100) disposable within a chamber (103) of a housing (101) and capable of being fluidly sealed with respect to the housing (101) when the valve is closed. At least one radial passage (117) is disposed in the valve body (100). At least one axial passage (119) is disposed in the valve body (100) in fluid communication with the at least one radial passage (117). When the valve at least partially opens, a fluid path opens between the valve body (100) and the housing (101), which fluid path (301) in is fluid communication with the at least one radial passage (117), and fluid from within the housing (101) is capable of passing out of the at least one axial passage (119).

24 Claims, 3 Drawing Sheets

VALVE HAVING AXIAL AND RADIAL PASSAGES

FIELD OF THE INVENTION

This invention relates to drain valves, including but not limited to oil drain valves for internal combustion engines.

BACKGROUND OF THE INVENTION

Internal combustion engines include a lubrication system that typically includes an oil pan, an oil pump, and a filter. The oil pump circulates oil from the pan through the filter. The filter and the oil are regularly replaced to maintain desired engine operation and reduce engine failures.

An oil filter may comprise a cartridge disposed in housing that is attached to the engine. A cap is often utilized to seal the filter and the oil in the housing, and to facilitate removal of the filter. In some implementations, the cap is disposed below the filter. Oil is likely to be present in the housing above the cap, and the oil may spill when the cap is removed. Spilled oil may be hot and slippery, and for obvious reasons is undesirable.

Oil plugs are known to seal a drain hole in a lubrication system. When the oil plug is unscrewed to allow oil to drain, the oil flows between the threads of the plug, often spilling oil on the tool and/or hand removing the plug and the floor. The plug may also fall into the container that catches used oil and then may need to be retrieved from the oil before new oil may be added to the engine.

Accordingly, there is a need for an oil draining system that permits oil to be safely and cleanly drained from a lubrication system for an internal combustion engine.

SUMMARY OF THE INVENTION

A valve includes a valve body disposable within a chamber of a housing and capable of being fluidly sealed with respect to the housing when the valve is closed. At least one radial passage is disposed in the valve body. At least one axial passage is disposed in the valve body in fluid communication with the at least one radial passage. When the valve at least partially opens, a fluid path opens between the valve body and the housing, which fluid path in is fluid communication with the at least one radial passage, and fluid from within the housing is capable of passing out of the at least one axial passage.

DESCRIPTION OF A PREFERRED EMBODIMENT

The following describes an apparatus for and method of draining a fluid, such as oil from a lubrication system, by providing a drain valve that permits controlled flow of a fluid such as oil. One or more radial drain passages and one or more axial drain passages are in fluid communication with each other. These passages are sealed from the fluid source when the drain valve is closed, and are open to the fluid source when the drain valve is open. The interface between the valve and its housing are sealed from the fluid. Fluid may then be drained through a known and controlled path that tools and hands are capable of avoiding, thus reducing fluid spills.

Figure 1:
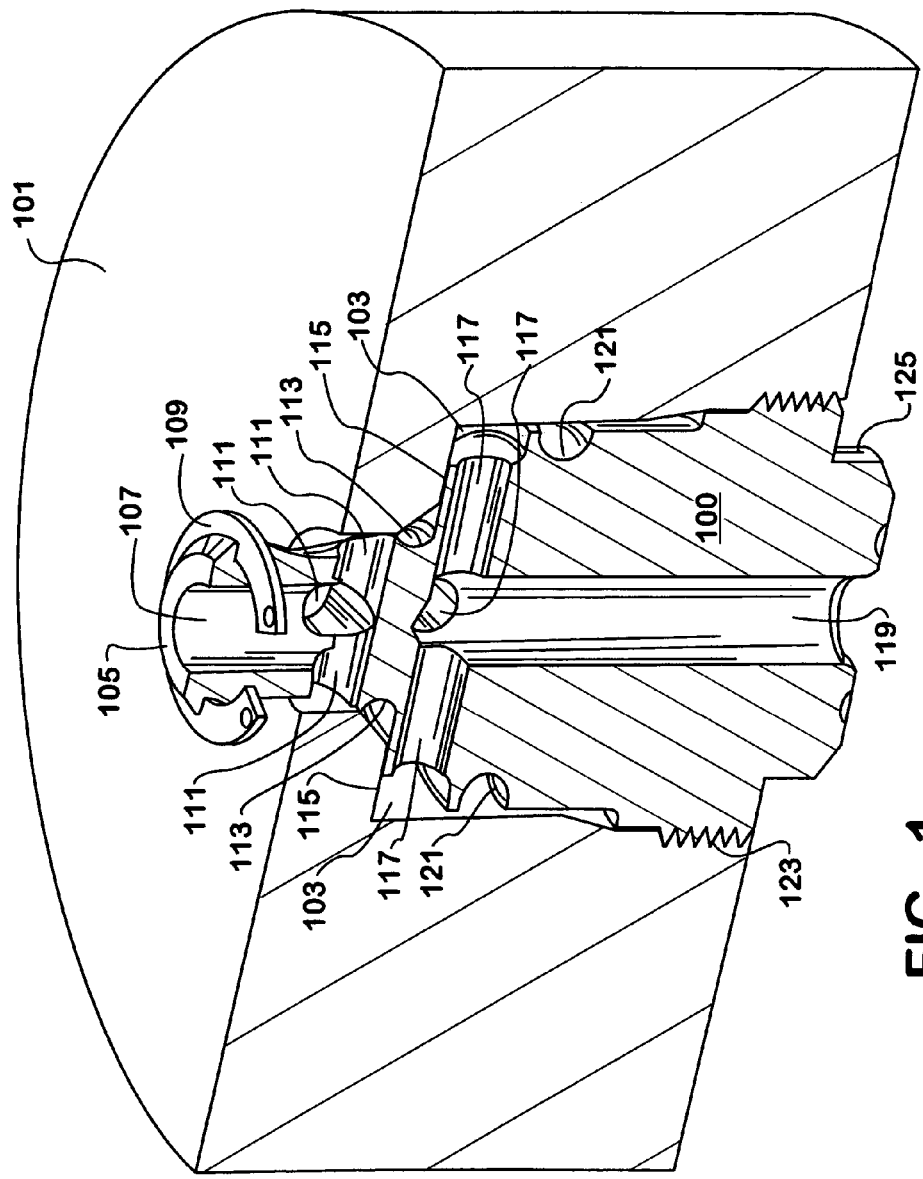
FIG. 1 is a cross-sectional view of a valve disposed in a housing in accordance with the invention.

A cross-sectional view of a valve disposed in a housing is shown in FIG. 1. A valve body 100 is used in conjunction with a housing 101. The valve body 100 is advantageously generally circular and symmetrical in shape. The housing 101 may be, for example, a cap that encloses a cartridge-type oil filter within an oil filter housing, a canister that encloses a fluid filter element, an oil pan, or other apparatus in a lubrication system. The lower part of the housing 101 is shown in the drawings for the sake of simplicity. The valve body 100 is disposed in a chamber 103 formed in the housing 101. The valve body advantageously includes a valve head 105 that includes one or more axial drain channels 107 that are in fluid communication with fluid in the housing 101. One axial drain channel is shown in the figures for the sake of simplicity. An optional snap ring 109 may be advantageously disposed in a slot in the valve head 105, which snap ring 109 is capable of retaining the valve body 100 with the housing 101 when the drain valve is open. Other retention devices, such as a c-ring, a metal or plastic cord attached to the housing 101 and the valve body 100, and so forth, may also be utilized. The snap ring 109 has a surface that is larger than the opening of the chamber 103 where the valve head 105 fits in the housing 101. One or more radial drain channels 111 are in fluid communication with the axial drain channel(s) 107. A recess is formed below the radial drain channels 111 and above a stop 115.

One or more radial drain passages 117 are in fluid communication with one or more axial drain passages 119. One axial drain passage is shown in the figures for the sake of simplicity. The axial drain passage 119 has an open end that permits fluid that enters the axial drain passage 119 to exit the valve body. A slot 121 is disposed in the valve body below the radial drain passage(s) 117. An engagement interface 123, such as a threaded interface wherein a surface of the valve body 100 and a surface of the housing 101 are both threaded with mating threads. A tool engagement element 125 is advantageously disposed below the housing 101 to permit a tool, such as a wrench or a hand, to open and/or close the valve body 100. For a threaded engagement, the tool engagement element 125 permits rotation of the valve body 100 to open and/or close the drain valve. The tool engagement element 125 may comprise, for example, a hexagon shape that receives a wrench that rotates the valve body 100 within the housing 101.

Figure 2:
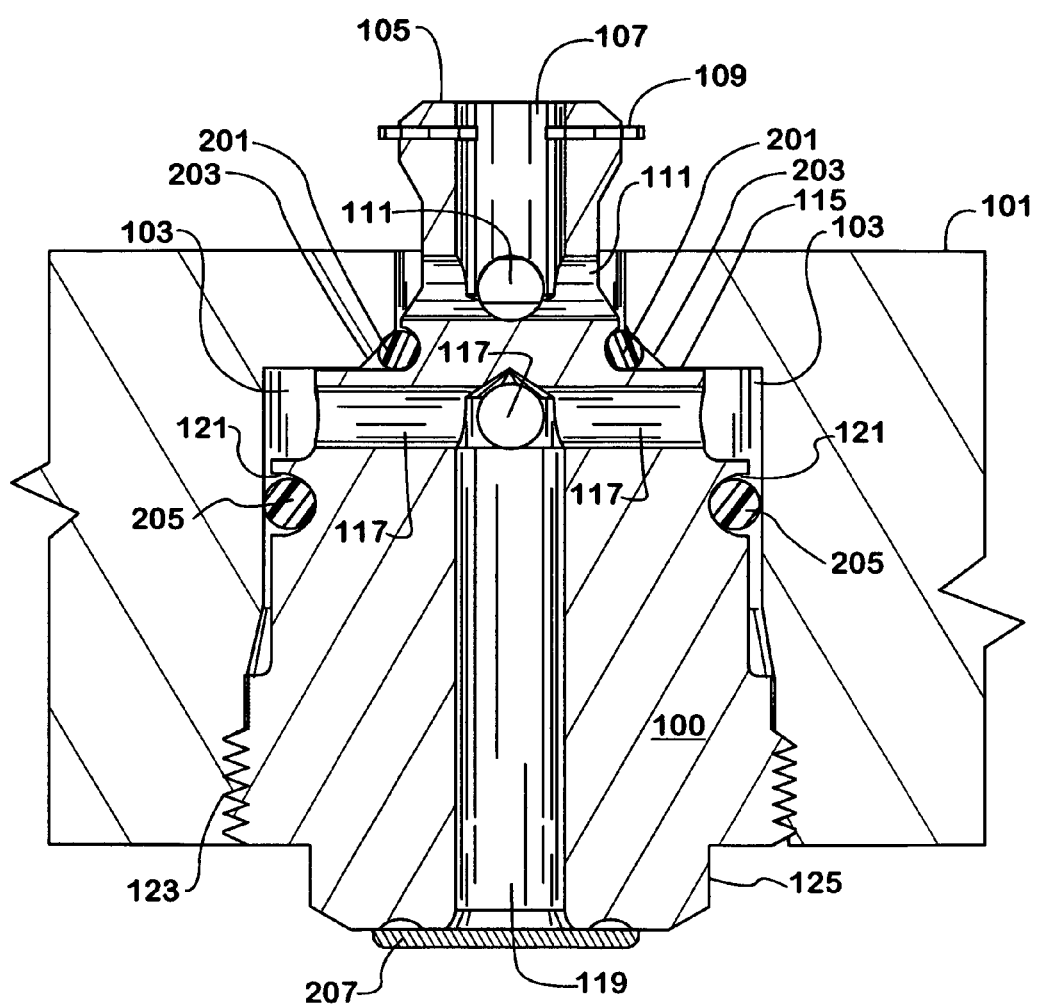
FIG. 2 is a side view of a cross-section of a valve in a closed position in accordance with the invention.

A side view of a cross-section of a valve in a closed position is shown in FIG. 2. A first seal 201 is disposed in the recess 113 between the valve body 100 and a chamfer 203 of the housing 101. The first seal 201 prevents fluids from entering into the radial drain passage(s) 117 and axial drain passage(s) when the drain valve is in a closed position. Alternatively, a device (not shown), such as a copper disk, may be disposed at the stop 115 to provide a seal between the valve body and the housing 101. A second seal 205 is disposed in the slot 121 between the valve body and the housing within the chamber 103. The second seal 205 prevents fluids from reaching the engagement interface 123. An optional cap or plug 207 may cover the opening of the axial drain passage(s) 119 to prevent contaminants and other debris from entering and/or clogging the axial drain passage(s) 119 and, if necessary, to prevent any fluid from exiting the axial drain passage(s) 119. The cap or plug 207 may be attached to the valve body 100 by a retaining device.

Figure 3:
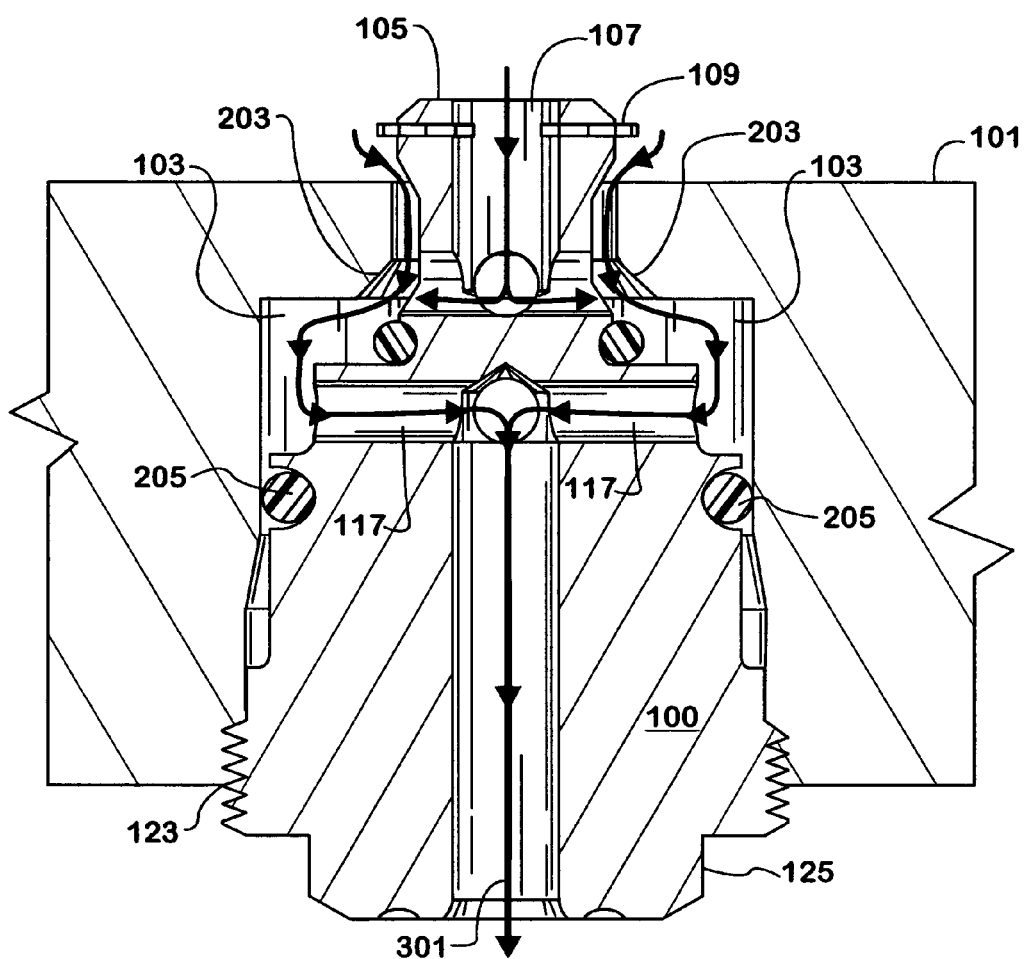
FIG. 3 is a side view of a cross-section of a valve in an open position in accordance with the invention.

A side view of a cross-section of a valve in an open position is shown in FIG. 3. When the drain valve is open, the space in the chamber 103 between the housing 101 and the drain body 100 expands, the first seal 201 separates from the chamfer 203, and a fluid path 301 in communication with the radial drain passage(s) 117 facilitates fluid from within the housing 101 to exit the open end of the axial drain passage(s) 119. Thus, when the valve opens, a fluid path opens between the valve body and the housing 101, such that the environment inside the housing 101 is in fluid communication with the environment outside the housing 101. The second seal 205 maintains engagement between the valve body 100 and the housing 101, preventing fluid from reaching the engagement interface 123 and leaking out between the housing 101 and the valve body 100.

The fluid path 301 may include a path where fluid enters the axial drain channel(s) 107 and continues into the radial drain channel(s) 111 and into the opening in the chamber 103 before entering the radial drain passage(s) 117 and the axial drain passage(s) 119 and out the drain valve. The fluid path 301 may also permit fluid to enter between the valve head 105 and the housing 101, which fluid merges with the fluid from the axial drain channel(s) 107. Although two paths are provided for fluid to enter the drain valve, only one path need be provided for successful implementation of the drain valve.

When the drain valve is open, fluid is permitted to exit only through the open end of the axial drain passage(s) 119, but not through the engagement interface 123. By providing a single controllable path for fluid that permits either a hand or a wrench to open and close the drain valve, unwelcome and uncontrolled spills may be avoided. The drain valve thus provides an ideal mechanism for use as a drain valve for an oil lubrication system for an internal combustion engine.

Although the channels 107 and 111 and passages 117 and 119 are generally shown perpendicular to each other, the channels 107 and 111 and passages 117 and 119 may be disposed at angles with respect to each other. For example, the radial channels/passages 111/117 may form a slight downward angle with respect to the respective axial channels/passages 107/119, thereby facilitating downward flow of fluid through the valve body 100. The valve body 100 is advantageously formed of plastic, but may be formed of other materials. The channels 107 and 111 and passages 117 and 119 may be formed into the valve body 100 and/or machined into it. Although the channels 107 and 111 and passages 117 and 119 are referred to as axial or radial, these terms are generally utilized to show reference between the channels 107 and 111 and passages 117 and 119 and not necessarily to require that the channels or passages are oriented axially or radially, as other orientations of the channels and passages may be utilized within the spirit and scope of the invention.

Although the above description utilizes the example of an oil filter for an internal combustion engine, the present invention may be applied to many other applications where it is desirable to drain fluid in a more controlled way. The drain valve may be utilized for other fluids than oil, such as fuel, water, coolant, brake fluid, transmission fluid, and other fluids that may produce a hazardous or unwanted spill. The valve may also be utilized for gaseous fluids.

The present invention provides numerous advantages. The oil drain valve facilitates draining of oil in a safe and clean manner. The oil drain valve is inexpensive and simple, and may be employed in an oil pan, a filter housing cap, a filter canister, or other device in the lubrication system. The need for a pump or other expensive or complicated apparatus is avoided. The snap ring retains the valve with the housing, thereby preventing loss or soiling of the drain valve, for example, an oil collection pan. The present invention may be retrofitted to existing lubrication systems. Additional space may not be needed for the drain valve, depending on the housing.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A valve comprising:
   a valve body disposable within a chamber of a housing and capable of being fluidly sealed with respect to the housing when the valve is closed;
   at least one radial passage disposed in the valve body;
   at least one axial passage disposed in the valve body in fluid communication with the at least one radial passage;
   a threaded engagement interface disposed on the valve body and engaged with the housing;
   a seal disposed between the valve body and the housing and capable of preventing fluid in the fluid path from reaching the threaded engagement interface;
   wherein, when the valve at least partially opens, a fluid path opens between the valve body and the housing, which fluid path in is fluid communication with the at least one radial passage, and fluid from within the housing is capable of passing out of the at least one axial passage.

2. The valve of claim 1, further comprising:
   at least one radial channel disposed in the valve body;
   at least one axial channel disposed in the valve body in fluid communication with the at least one radial channel.

3. The valve of claim 1, wherein the at least one radial passage is disposed at an angle other than 90 degrees from the at least one axial passage.

4. The valve of claim 1, wherein the seal disposed on the valve body prevents fluid in the fluid path from leaking between the valve body and the housing.

5. The valve of claim 1, further comprising a retention device disposed on the valve body and capable of retaining the valve body with the housing, wherein the retention device is disposed in the housing.

6. The valve of claim 1, wherein the housing is a filter cap for an oil filter.

7. The valve of claim 1, wherein the housing is a canister for an oil filter.

8. The valve of claim 1, further comprising a tool engagement element capable of engaging a tool that operates to cause the valve to open by operating on an engagement interface disposed on the valve body and capable of engaging with the housing.

9. The valve of claim 8, wherein the engagement interface is a threaded interface and wherein the tool engagement element rotates the valve body along the threaded interface.

10. The valve of claim 1, further comprising a seal disposed on the valve body and capable of engaging with the housing at a position above the at least one radial passage when the valve is closed.

11. The valve of claim 1, wherein the valve is utilized in a lubrication system for an internal combustion engine.

12. The valve of claim 5, wherein the retention device is disposed in the housing and is capable of retaining the valve body with the housing when the valve fully opens.

13. The valve of claim 1, wherein the seal is disposed between the engagement interface and fluid from within the housing at all times.

14. An apparatus comprising:
a housing having a chamber;
a drain valve including a valve body disposed in the chamber and fluidly sealed with respect to the housing when the valve body is in a closed position;
at least one radial drain channel disposed in the valve body;
at least one axial drain channel disposed in the valve body in fluid communication with the at least one radial drain channel;
at least one radial drain passage disposed in the valve body;
at least one axial drain passage disposed in the valve body in fluid communication with the at least one radial drain passage;
an engagement interface disposed on the valve body and engaged with the housing;
a seal disposed between the valve body and the housing and capable of preventing fluid in the fluid path from reaching the engagement interface;
wherein, when the drain valve at least partially opens by operation of the engagement interface, a fluid path opens between the valve body and the housing, which fluid path in is fluid communication with the at least one radial drain passage, and fluid from within the housing is capable of passing out of the at least one axial drain passage.

15. The apparatus of claim 14, wherein the engagement interface is a threaded interface.

16. The apparatus of claim 14, further comprising a retention device disposed on the valve body and capable of retaining the valve body with the housing.

17. The apparatus of claim 14, wherein the housing is one of a filter cap for an oil filter and a canister for an oil filter.

18. The apparatus of claim 14, further comprising a tool engagement element capable of engaging a tool that operates to cause the drain valve to open by rotating the valve body at the engagement interface.

19. The apparatus of claim 14, further comprising a seal disposed between the valve body and the housing at a position above the at least one radial drain passage when the drain valve is closed.

20. The apparatus of claim 14, wherein the at least one radial drain passage is disposed at an angle other than 90 degrees from the at least one axial drain passage.

21. A valve comprising:
a valve body disposable within a chamber of a housing;
at least one axial channel disposed at a first end of the valve body and having an opening in fluid communication with an environment inside the housing;
at least one radial channel in fluid communication with the at least one axial channel and disposed in the valve body;
at least one radial passage disposed in the valve body;
a first seal disposed on the valve body between the at least one radial channel and the at least one radial passage;
at least one axial passage in fluid communication with the at least one radial passage, disposed at a second end of the valve body, and having an opening in fluid communication with an environment outside the housing;
an engagement interface disposed on the valve body and capable of engaging with the housing;
a second seal disposed on the valve body between the at least one radial passage and the engagement interface, such that fluid in the fluid path is prevented from reaching the engagement interface;
wherein, when the valve at least partially opens, a fluid path opens between the valve body and the housing, such that the environment inside the housing is in fluid communication with the environment outside the housing.

22. The valve of claim 21, further comprising a retention device disposed on the valve body and capable of retaining the valve body with the housing.

23. The valve of claim 21, wherein the at least one radial passage is disposed at an angle other than 90 degrees from the at least one axial passage.

24. The valve of claim 21, further comprising a tool engagement element capable of engaging a tool that operates to cause the valve body to open by rotating the valve body at the engagement interface.

* * * * *